Sept. 6, 1938.  C. F. JOHNSON  2,129,061
BRAKE EQUALIZER
Filed May 10, 1937
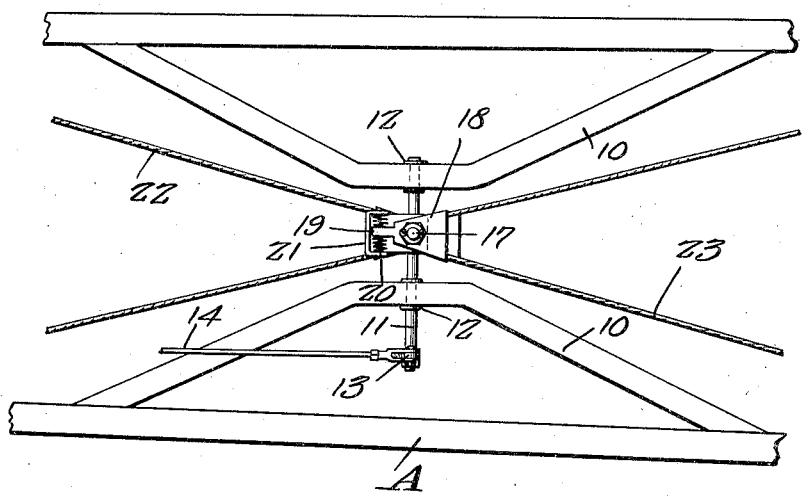
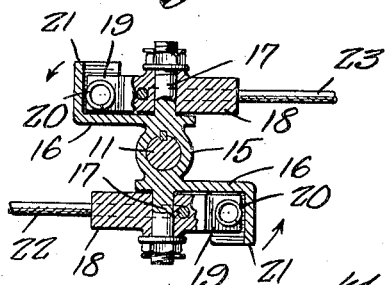
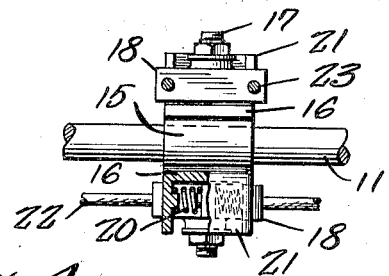
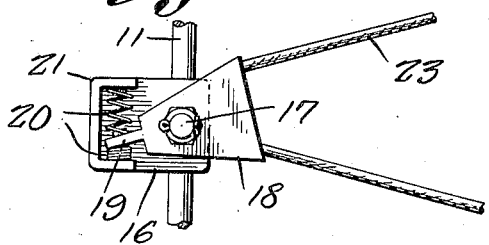
Chester F. Johnson, INVENTOR
BY Victor J. Evans & Co.
ATTORNEYS
WITNESS Patented Sept. 6, 1938

2,129,061

UNITED STATES PATENT OFFICE 2,129,061

BRAKE EQUALIZER

Chester F. Johnson, Los Angeles, Calif.

Application May 10, 1937, Serial No. 141,821

2 Claims. (Cl. 188—204)

The invention relates to a brake equalizer and more especially to that class of equalizers for front and rear wheel brakes of a vehicle.

The primary object of the present invention is the provision of an equalizer of this character, wherein on the applying of the front and rear wheel brakes of a vehicle any irregularities in the application of these will be overcome and such equalizer is a refinement over the subject matter of United States Letters Patent No. 2,052,473 issued August 25, 1936.

Another object of the invention is the provision of an equalizer of this character, which is simple in its construction, thoroughly effective in its operation, automatic in the working of the same, strong, durable, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a fragmentary plan view of a motor vehicle chassis showing the equalizer constructed in accordance with the invention in association with the fragmentary mechanism of the vehicle.

Figure 2 is a vertical longitudinal sectional view through the equalizer.

Figure 3 is a fragmentary elevation partly in section.

Figure 4 is an enlarged fragmentary top plan view showing the equalizer for one pair of brakes in a shifted position.

Similar reference characters indicate corresponding parts throughout the several views in the drawing.

Referring to the drawing in detail, A designates generally a portion of the chassis of a motor vehicle in which approximately midway of the length of such chassis are arranged opposed inwardly approaching truss bars 10, these being at the longitudinal median of said chassis separated from each other and at this separation is provided a turning shaft 11 being journaled at 12 in the bars 10 to be disposed transversely of the said chassis. Fixed to the turning shaft 11 at one end thereof is an arm 13 to which is pivoted a throw rod 14 operated by a brake pedal (not shown) of the conventional type installed in the motor vehicle so that the shaft 11 may be turned.

Located in the separation between the bars 10 at the longitudinal center of the chassis A and suitably fixed, either splined or keyed to the shaft 11 is the hub 15 of a rocking carrier involving in addition to the hub the reversely extended plate-like racks 16, these being disposed at diametrically opposed sides of the hub 15 and are formed with pivot lugs 17 aligned with the shaft 11 and extended radially therefrom at opposite sides of the same. These pivot lugs 17 are centered in the racks 16 and are preferably integral therewith.

Swingingly fitted with the lugs 17 and within the racks 16 are equalizer levers 18, each pivotally acting independently of the other and has formed therewith at one end an abutment or a wing terminal disposed between a pair of opposed compression springs 20 seated against an end walling 21. The walling 21 is common to both racks 16 and is located at the outermost ends of the same, these being reversely extended from the hub 15.

Anchored in the levers 18 are the forwardly divergent and rearwardly divergent front wheel and rear wheel brake applying cables 22 and 23, respectively, which extend to and operate brakes (not shown) for the pairs of front and rear wheels, respectively, of the motor vehicle.

The compression springs 20 active upon the levers 18 normally hold the latter in a neutral aligning position with the longitudinal median of the vehicle chassis A.

On manipulating the foot brake pedal, being understood, of course, that the brakes of the vehicle are normally neutral or are not applied, the shaft 11 will be turned and likewise the carrier involving the hub 15 and the rack 16 will be rocked in an arcuate path thus causing the application of the brakes through pull on the cables 22 and 23, these for operating the front and rear brakes being respectively of equal length which allows for the same amount of friction on the two front and the two rear brakes and should there be an unequal wear in the pairs, that is, the two front and the two rear brakes, the equalizer levers 18 will become automatically adjusted to effect uniform equal pressure on the part of either of the front or rear brakes.

When the foot brake pedal is relieved of pressure through spring action of the brake mechanism setup or equipment of the vehicle the brakes return to neutral position, the brake mechanism or equipment being of any standard drum type.

What is claimed is:

1. A brake equalizing means comprising a rock shaft, a member fixed to said shaft, oppositely extending trunnions carried by said member, a brake operating lever pivoted on each trunnion, a laterally extending rack carried by said member adjacent the inner end of one trunnion, a second laterally extending rack carried by said member adjacent the inner end of the other trunnion and extending in a direction oppositely of said first rack, each rack including a U-shaped flange, and a pair of springs within each flange and engaging on opposite sides of a lever to thereby normally bias said lever to a central position with respect to the parallel legs of said flange.

2. A brake equalizing means comprising a rock shaft, a sleeve fixed to said shaft, oppositely extending trunnions carried by said sleeve, the axes of said trunnions being disposed at right angles to the axis of said shaft, a brake operating lever pivoted on each trunnion, a laterally extending rack carried by said sleeve adjacent the inner end of one trunnion, a second laterally extending rack carried by said sleeve adjacent the inner end of the other trunnion and extending in a direction oppositely of said first rack, each rack including a U-shaped flange on one side thereof and adjacent the outermost end thereof, and a pair of springs within each flange and engaging on opposite sides of a lever to thereby normally bias said lever to a central position with respect to the parallel legs of said flange.

CHESTER F. JOHNSON.